(12) United States Patent
Scryba

(10) Patent No.: US 10,897,843 B1
(45) Date of Patent: Jan. 26, 2021

(54) APPARATUS FOR PLANTING SEEDS

(71) Applicant: Dennis Scryba, Forney, TX (US)

(72) Inventor: Dennis Scryba, Forney, TX (US)

( * ) Notice: Subject to any disclaimer, the term of this patent is extended or adjusted under 35 U.S.C. 154(b) by 196 days.

(21) Appl. No.: 16/161,560

(22) Filed: Oct. 16, 2018

(51) Int. Cl.
*A01C 5/02* (2006.01)
*A01C 7/02* (2006.01)

(52) U.S. Cl.
CPC . *A01C 5/02* (2013.01); *A01C 7/02* (2013.01)

(58) Field of Classification Search
CPC .................................... A01C 5/02; A01C 7/02
See application file for complete search history.

(56) References Cited

U.S. PATENT DOCUMENTS

| | | | | | |
|---|---|---|---|---|---|
| 12,465 | A | * | 2/1855 | Barnhart | A01C 7/02 111/95 |
| 13,419 | A | * | 8/1855 | Barnhart | A01C 7/02 111/95 |
| 182,367 | A | * | 9/1876 | Jones | A01G 23/046 111/101 |
| 1,720,601 | A | * | 7/1929 | Kalenoff | A01C 7/02 111/96 |
| 1,830,283 | A | * | 11/1931 | Madderra | A01C 7/02 111/92 |
| 2,531,297 | A | * | 11/1950 | Rose | A01C 5/02 111/101 |
| 2,865,315 | A | * | 12/1958 | Goldstein | A01C 5/02 111/92 |
| 2,891,813 | A | * | 6/1959 | Inaki | E21B 11/005 294/50.6 |
| 3,150,620 | A | * | 9/1964 | Popplewell | A01C 5/02 111/106 |
| 3,170,422 | A | * | 2/1965 | Gregory | A01C 5/02 111/96 |
| 3,506,296 | A | * | 4/1970 | Nelson | A01B 1/165 111/101 |
| 3,749,034 | A | * | 7/1973 | Bergius | A01C 5/02 111/106 |
| 4,114,543 | A | * | 9/1978 | Mitchell | A01C 5/02 111/96 |
| 4,191,116 | A | * | 3/1980 | Allison, Jr. | A01C 5/02 111/106 |
| 4,706,582 | A | * | 11/1987 | Keskilohko | A01C 5/02 111/106 |

(Continued)

*Primary Examiner* — Jamie L McGowan
(74) *Attorney, Agent, or Firm* — Sanchelima & Associates, P.A.; Christian Sanchelima; Jesus Sanchelima

(57) ABSTRACT

An apparatus for planting seeds comprises an elongated tube comprising a piston, a shaft coupled to the piston, and a cylinder coupled to the piston. The apparatus comprises a foot bar and a handle bar, coupled to the elongated tube. The handle bar comprises a lever coupled to the shaft. Further, the apparatus comprises a container provided at the handle bar to store seeds. The container comprises a first conduit extended over the length of the elongated tube. A user of the apparatus applies pressure on the foot bar to insert the elongated tube in ground. The lever is operated to lift the container via the shaft and the piston such that the dirt collected in the container creates a hole in the ground. Subsequently, the seeds are made to fall in the hole through the first conduit. Further, the lever is operated to drop the dirt collected in the container into the hole to cover the seeds in the hole.

20 Claims, 3 Drawing Sheets

(56) References Cited

U.S. PATENT DOCUMENTS

| | | | | |
|---|---|---|---|---|
| 4,843,982 A * | 7/1989 | Nagy-Szakaly | ......... | A01C 5/02 111/96 |
| 4,884,638 A * | 12/1989 | Hoffman | ................ | A01B 1/165 172/22 |
| 4,974,682 A * | 12/1990 | Hoffman | ................ | A01B 1/165 172/22 |
| 5,170,729 A * | 12/1992 | Benner | ................... | A01C 5/02 111/7.2 |
| 5,471,939 A * | 12/1995 | Chancey | ................. | A01C 5/02 111/107 |
| 5,493,977 A * | 2/1996 | Maisch | ................... | A01C 5/02 111/90 |
| 5,584,256 A * | 12/1996 | Fleming | ................... | A01C 5/02 111/92 |
| 5,924,369 A * | 7/1999 | Hatcher | .................. | A01C 5/02 111/106 |
| 6,123,374 A * | 9/2000 | Elder | ..................... | A01B 1/165 294/50 |
| 6,279,496 B1 * | 8/2001 | Mitchell | ................ | A01C 5/02 111/92 |
| 6,349,776 B1 * | 2/2002 | Hus | ......................... | A01B 1/14 172/22 |
| 6,637,355 B2 * | 10/2003 | Springs | ................... | A01B 1/24 111/95 |
| 6,662,879 B1 * | 12/2003 | Costa | ...................... | A01C 5/02 172/22 |
| 7,143,703 B2 * | 12/2006 | Gallant | ................... | A01C 5/02 111/92 |
| 7,150,238 B1 * | 12/2006 | Kontorovich | ........... | A01C 5/02 111/92 |
| 9,192,092 B2 * | 11/2015 | Tangorra | ................. | A01C 7/02 |
| 9,609,801 B2 * | 4/2017 | Kim | ......................... | A01C 5/02 |
| 2009/0120655 A1 * | 5/2009 | Hansen | ................ | E01C 23/092 172/19 |

* cited by examiner

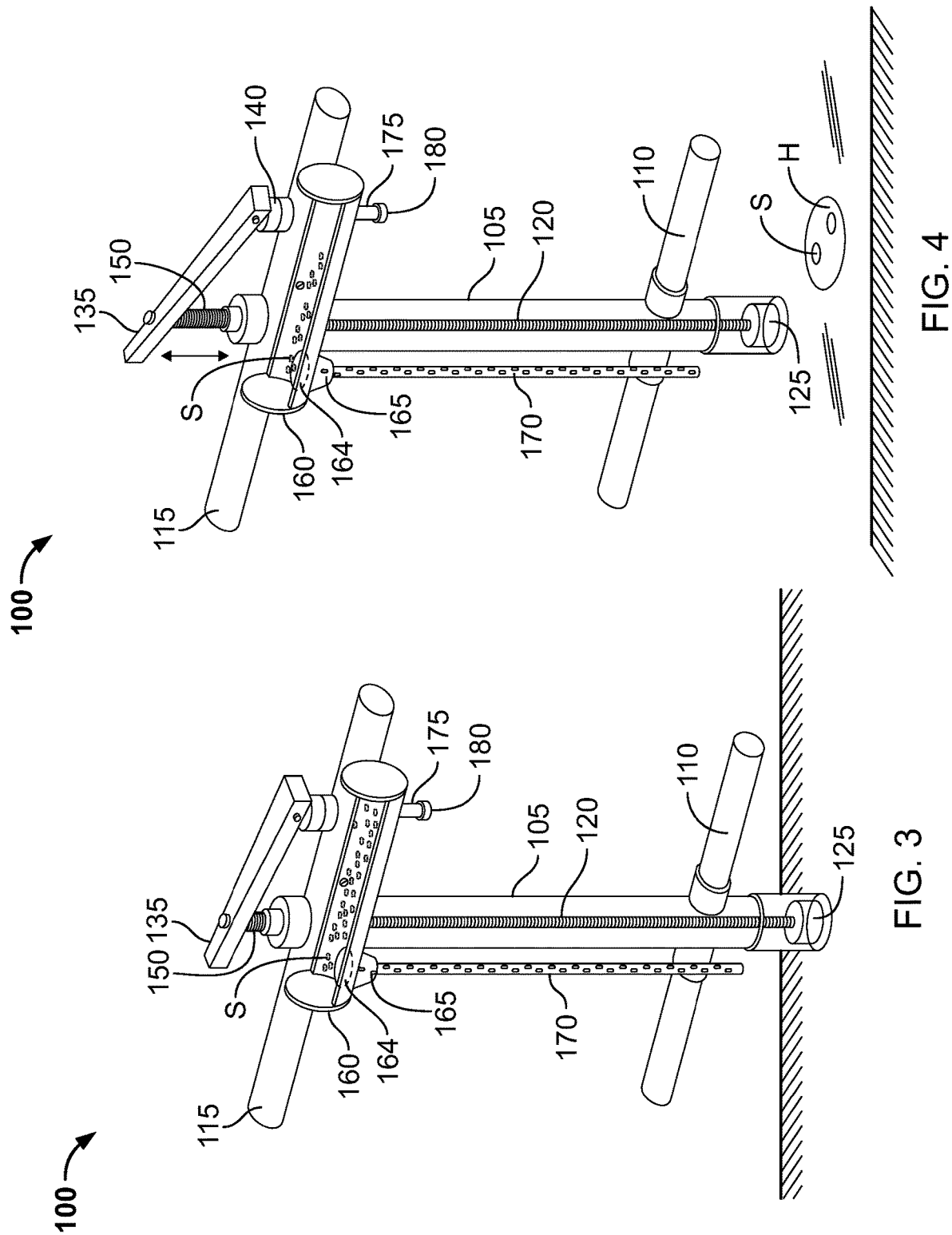

APPARATUS FOR PLANTING SEEDS

BACKGROUND OF THE INVENTION

1. Field of the Invention

The present disclosure generally relates to an apparatus for planting seeds. More specifically, the present disclosure relates to an apparatus for making a hole in the ground, planting seeds and covering the hole.

2. Description of the Related Art

It is known that many people are taking up gardening in a backyard of their homes or at other places. The people may take up gardening for the love of nature or to grow plants for vegetables to be used at homes. The plants may include, but not limited to, sunflower, bean, carrot, corn, peas and so on. In order to grow plants, people may buy ready-made plants in a store or grow the plants from seeds. Although it is easy to buy the ready-made plants and maintain the growth of the plants, some people prefer to sow the seeds and grow the plants.

Typically, the seeds may be sowed directly in the garden, either by broadcasting the seeds over a bed to give a planted-by-nature look or sown in the traditional rows of a vegetable or by cutting or digging the ground.

In order to dig the ground, a user or gardener may use a tool to make a pre-shaped hole in the ground. Subsequently, the user may place the seed in the hole and cover the hole with dirt. It should be understood that use of the tool to make the hole requires considerable effort from the user. Further, the user has to kneel and put the dirt to cover or close the hole after placing the seed.

Several attempts have been made in the past to provide apparatuses that help the user to plant the seed without much effort. An example of an apparatus for planting seeds is disclosed in a U.S. granted Pat. No. 6,279,496. In U.S. Pat. No. 6,279,496, a planting apparatus that features a staff or rod having a lower distal end portion that is a tapered is disclosed. The planting apparatus is used to form a cavity and plant a seed using a separate rod and delivery tube arrangement.

Another example of an apparatus for planting seeds is disclosed in a U.S. granted Pat. No. 5,471,939. In U.S. Pat. No. 5,471,939, a handheld mechanical operated device for planting seeds is disclosed. The device facilitates the user to stand erect and place seeds of various sizes in precise seedbeds.

It should be noted that the above disclosures have several problems. For instance, the devices discussed above do not allow the user to place the seeds in the hole accurately. Further, the user has to put considerable effort to make the hole. In addition, the dirt removed to make the hole is placed near the hole and again the dirt is put back to cover the hole. At times, when the dirt is collected to put back in the hole, surface becomes uneven for which the user has to bend and make it even. This again increases the effort of the user.

Other documents describing the closest subject matter provide for a number of more or less complicated features that fail to solve the problem in an efficient and economical way. None of these patents suggest the novel features of the present invention. Specifically, none of the disclosures in the art disclose an apparatus for making a hole and to plant seeds accurately in the hole.

Therefore, there is a need in the art for an apparatus for making a hole and to plant seeds accurately in the hole.

SUMMARY OF THE INVENTION

It is one of the main objects of the present invention to provide an apparatus for making a hole and to plant seeds accurately in the hole and avoids the drawbacks of the prior art.

It is one object of the present invention to provide an apparatus for making a hole in the ground, planting seeds and covering the hole.

It is one object of the present invention to provide an apparatus for planting seeds. The apparatus comprises an elongated tube comprising a piston, a shaft coupled to the piston, and a cylinder coupled to the piston. The apparatus comprises a foot bar and a handle bar, coupled to the elongated tube. The handle bar comprises a lever coupled to the shaft. Further, the apparatus comprises a container provided at the handle bar to store seeds. The container comprises a first conduit extended over the length of the elongated tube. A user of the apparatus applies pressure on the foot bar to insert the elongated tube in ground. The lever is operated to lift the container via the shaft and the piston such that the dirt collected in the container creates a hole in the ground. Subsequently, the seeds are made to fall in the hole through the first conduit. Further, the lever is operated to drop the dirt collected in the container into the hole to cover the seeds in the hole.

It is another object of the present invention to provide a spring member at the shaft to operate the lever.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which:

FIGS. 3 and 4 illustrate operation of the apparatus 100, in accordance with one embodiment of the present disclosure.

DETAILED DESCRIPTION OF THE EMBODIMENTS OF THE INVENTION

The following detailed description is intended to provide example implementations to one of ordinary skill in the art, and is not intended to limit the invention to the explicit disclosure, as one or ordinary skill in the art will understand that variations can be substituted that are within the scope of the invention as described.

The present disclosure discloses an apparatus for planting seeds. The apparatus comprises an elongated tube comprising a piston, a shaft coupled to the piston, and a cylinder coupled to the piston. The apparatus comprises a foot bar and a handle bar, coupled to the elongated tube. The handle bar comprises a lever coupled to the shaft. Further, the apparatus comprises a container provided at the handle bar to store seeds. The container comprises a first conduit extended over the length of the elongated tube. A user of the apparatus applies pressure on the foot bar to insert the elongated tube in ground. The lever is operated to lift the container via the shaft and the piston such that the dirt collected in the container creates a hole in the ground. Subsequently, the seeds are made to fall in the hole through the first conduit. Further, the lever is operated to drop the dirt collected in the container into the hole to cover the seeds in the hole.

Various features and embodiments of an apparatus for planting seeds are explained in conjunction with the description of FIGS. 1-4.

Figure 1:
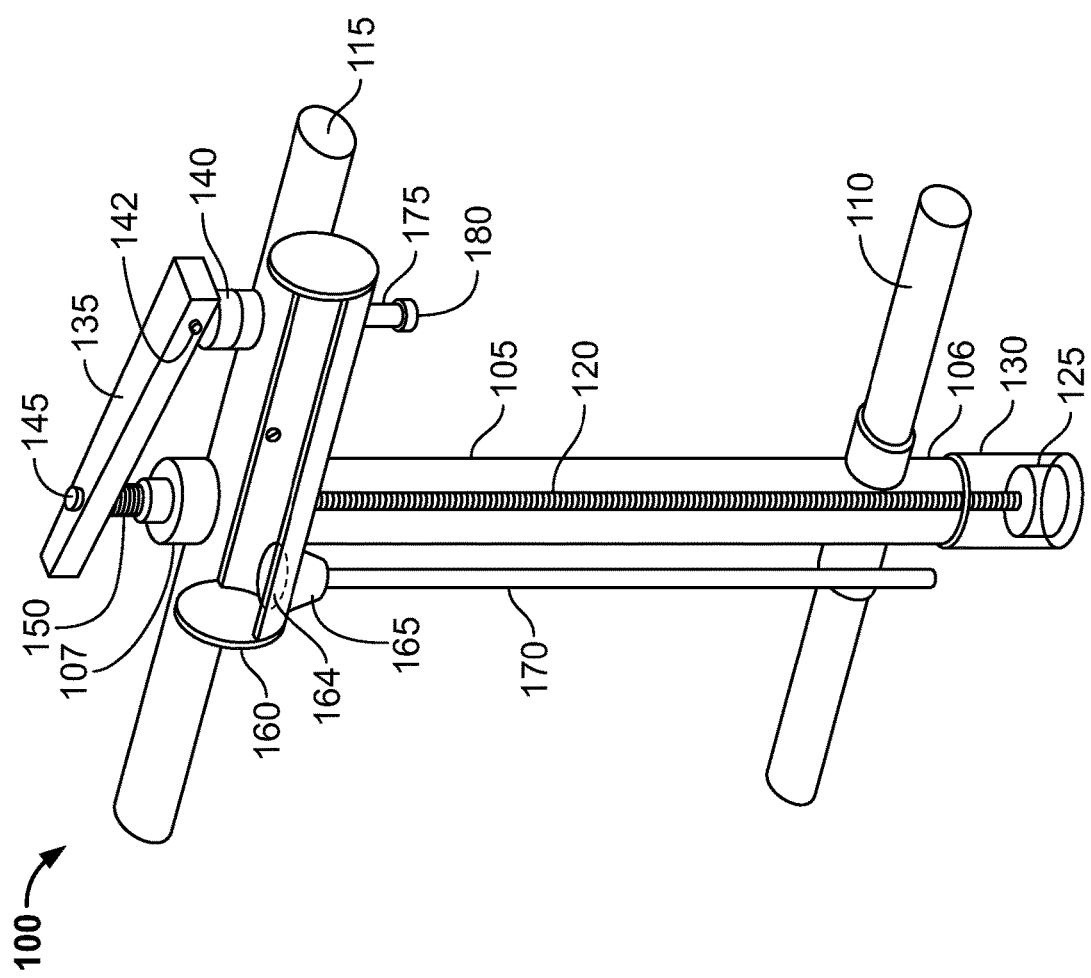
FIG. 1 illustrates a schematic diagram of an apparatus 100 for planting seeds, in accordance with one embodiment of the present disclosure.

Referring to FIG. 1, a schematic diagram of an apparatus 100 for planting seeds is shown, in accordance with one embodiment of the present disclosure. The apparatus 100 comprises an elongated tube 105. The elongated tube 105 may be provided in a cylindrical configuration in variety shapes such as circular, square or rectangular. The elongated tube 105 may be made up of materials such as a plastic e.g., Polyvinyl Chloride (PVC) or a metal or a suitable material. The elongated tube 105 comprises a first end 106 and a second end 107.

At the first end 106 of the elongated tube 105, a foot bar 110 is provided. The foot bar 110 may be made up of a metal or any other suitable material. In one example, the foot bar 110 is coupled to the elongated tube 105 using known mechanisms such as welding, fastening mechanism or using a clamp and so on.

Further, at the second end 107 of the elongated tube 105, a handle bar 115 is provided. The handle bar 115 may be made up of a metal or any other suitable material. In one example, the handle bar 115 is coupled to the elongated tube 105 using known mechanisms such as welding, fastening mechanism or using a clamp and so on.

Furthermore, the elongated tube 105 comprises a shaft 120 drawn through the elongated tube 105. In one example, the shaft 120 may be inserted through the second end 107 of the elongated tube 105. It should be understood that length of the shaft 120 may be equal or more than the elongated tube 105 such that the shaft 120 extends i.e., protrudes from the elongated tube 105 at the second tube 105. The shaft 120 comprises a piston 125 at one end. Further, the piston 125 is coupled to a cylinder 130. In one example, the diameter of the cylinder 130 is more than the diameter of the elongated tube 105.

The handle bar 115 further comprises a lever 135 coupled via a lever support 140. Specifically, the lever 135 is coupled to the lever support 140 using a first bolt 142. Further, the lever 135 is coupled to the shaft 120. In one example, the lever 135 is coupled to the shaft 120 using a second bolt 145. The lever 135 is operated with the help of lever support 140. When the lever 135 is raised, the shaft 120 is pulled such that the piston 125 and the cylinder 130 are also pulled up. In one embodiment, the shaft 120 comprises a spring member 150. The spring member 150 helps in operating the lever 135, which in turns operates the shaft 120, and the piston 125 and the cylinder 130.

Further, the handle bar 115 comprises a container 160. The container 160 may be made of suitable materials such as plastic or any other material. The container 160 is used to store seeds S. In order to release the seeds S, a hole 164 may be provided at the bottom of the container 160.

Further, the apparatus 100 comprises a funnel 165 provided in axis with the container 160. Specifically, the funnel 165 is aligned with the hole 164 provided in the container 160. In order to drop or dispense seeds S, the seeds S in the container 160 are made to fall into the funnel 165 through the hole 164. The funnel 165 further comprises a first conduit 170 extended over the length of the elongated tube 105. The first conduit 170 may be made of materials such as plastic or any other suitable material.

Furthermore, the container 160 may be provided with a second conduit 175 at other end of the container 160. The second conduit 175 may be provided with a cap 180 to seal the second conduit 175. The function of the second conduit 175 is explained in later part of the description.

Figure 2:
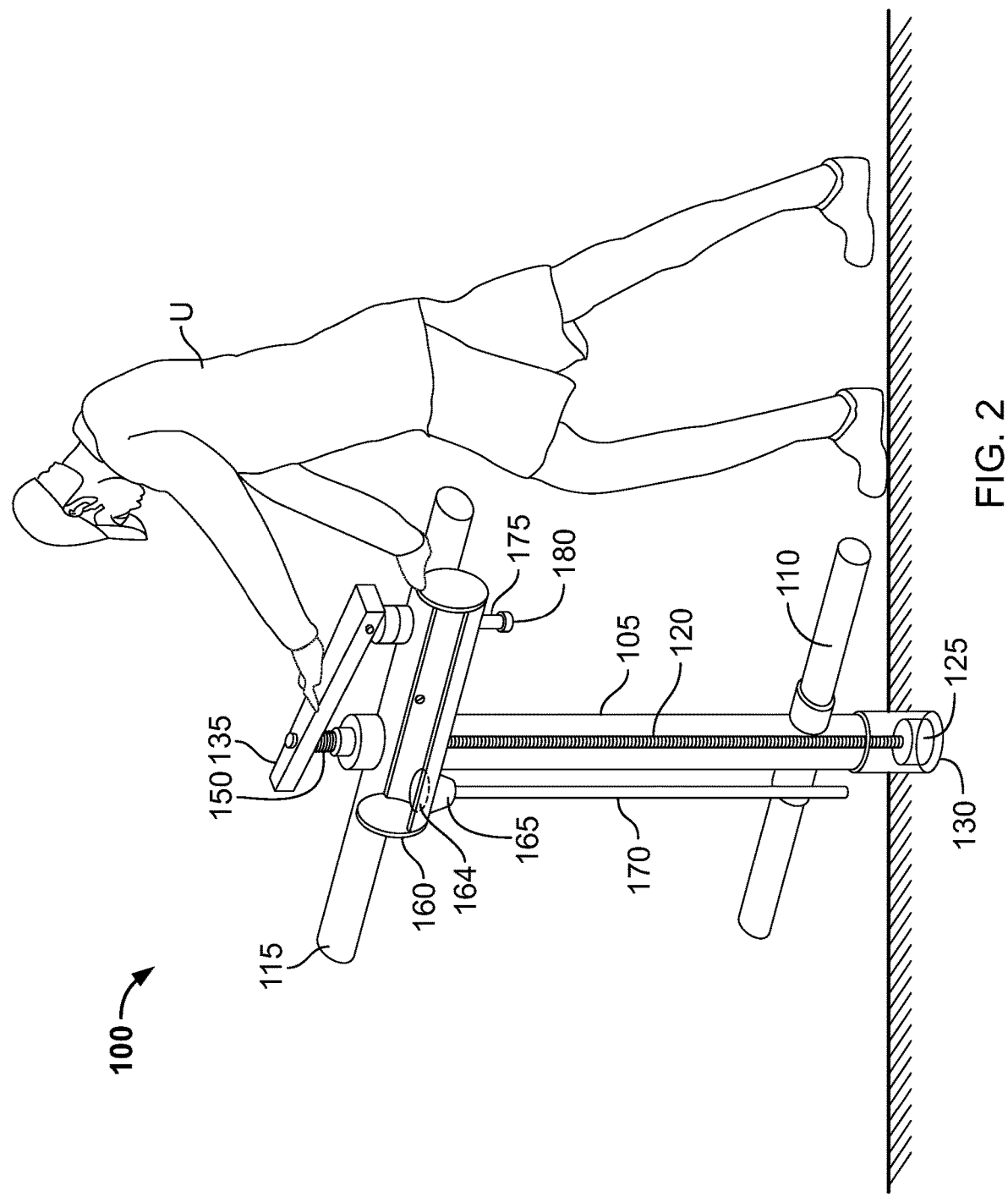
FIG. 2 illustrates the apparatus 100 being operated by a user U, in accordance with one embodiment of the present disclosure.

Referring to FIG. 2, a user U operating the apparatus 100 is shown, in accordance with one embodiment of the present disclosure. The user U may hold the handle bar 115 with one hand and hold the lever 135 with other hand. Further, the user U may place one leg on the foot bar 110 to operate the foot bar 110.

Now referring to FIGS. 3 and 4, operation of the apparatus 100 for planting seeds is explained. At first, the user U may place the apparatus 100 on the ground G where he wishes to make a hole H to plant the seeds S. After positioning the apparatus 100, the user U may place his leg or foot on the foot bar 110 such that pressure is exerted on the elongated tube 105 to insert the elongated tube 105 into the ground G. As can be seen from FIG. 3, when the elongated tube 105 is inserted in the ground G, the cylinder 130 also enters the ground G and dirt is collected in the cylinder 130.

After collecting the dirt in the cylinder 130, the user U operates the lever 135 i.e., lifts the lever 135 such that the cylinder 130 is lifted with the help of the shaft 120 and the piston 125. It should be understood that a hole H is created in the ground G when the dirt is collected in the cylinder 130 (as can be seen in FIG. 4).

Subsequently, the user U removes the apparatus 100 such that the apparatus 100 is moved away from the hole H. After removing the apparatus 100, the user U aligns the first conduit 170 in axis with the hole H. Subsequently, the user U releases the seeds S from the container 160 into the funnel 165 through the hole 164. Subsequently, the seeds S enter the hole H made in the ground G.

After releasing the number or amount of seeds S required into the hole H, the user U aligns the apparatus 100 in axis with the hole H (similar to FIG. 3). Subsequently, the user U presses the lever 135 such that the cylinder 130 is made to go down with the help of the shaft 120 and the piston 135. When the cylinder 130 is pushed down, the dirt collected in the cylinder 130 is released in the hole H. The dirt released from the cylinder 130 is used to fill the hole H such that the seeds S are covered with the dirt. The above operation is repeated to dig more holes H and to plant the seeds S in the holes H.

After dispensing the seeds S into the hole H, the cap 180 is removed such that the second conduit 175 is opened. Subsequently, the remaining seeds S in the container 160 is dispensed into a vessel or pack through the second conduit 175 such that the container 160 is emptied and the remaining seeds S can be used for planting seeds S in another place using the description provided above.

As it is evident from the above disclosure, the apparatus can be used to dig a hole by collecting the dirt from the ground, release the seeds into the hole and then cover the seeds with the dirt collected thereby planting the seeds with ease. The user can use the apparatus without much effort. In order to dig the hole and to cover the hole with dirt, the user does not have to kneel or bend. The user can stand and collect the dirt to make the hole, release the seeds in the hole and release the dirt collected to cover the hole with the help of the apparatus.

As such, people of all age groups can use the apparatus to plant seeds. In addition, the apparatus may be provided in different sizes such that even kids or people with a disability can plant seeds using the description provided above. In addition, the lever may be provided in variety of designs such that both right handed and left handed people can operate the apparatus easily to plant seeds without much manual effort.

Further, as the dirt collected to create the hole is held with the container, the ground remains clean when the hole is created. Further, the dirt collected is put back in the hole such that the ground remains relatively clean even after covering the seeds with the dirt.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. An apparatus for planting seeds, the apparatus comprising:
   an elongated tube including a piston, a shaft coupled to the piston, and a cylinder coupled to the piston;
   a foot bar coupled to the elongated tube;
   a handle bar coupled to the elongated tube, said foot bar and said handle bar being parallel to each other;
   a lever provided at the handle bar, wherein the lever is coupled to the shaft, said lever being suspended entirely above of said handle bar;
   a container provided adjacent to the handle bar, wherein the container stores seeds within, said container extending a partial length of said handle bar; and
   a first conduit extended over the length of the elongated tube and coupled to the container entirely underneath of the container, such that pressure is applied on the foot bar to insert the elongated tube in ground, wherein the lever is operated to lift the cylinder via the shaft and the piston such that the dirt collected in the cylinder creates a hole in the ground, wherein the seeds are made to fall in the hole through the first conduit, and wherein the lever is operated to drop the dirt collected in the cylinder into the hole to cover the seeds in the hole, said first conduit and said elongated tube being parallel to each other.

2. The apparatus of claim 1, wherein the foot bar is provided at one end and the handle bar is coupled at the other end of the elongated tube.

3. The apparatus of claim 1, wherein the lever is coupled to the shaft via a spring member, said spring member being centrally located on said handle bar.

4. The apparatus of claim 1, wherein the first conduit includes a funnel underneath of said container to receive the seeds from the container.

5. The apparatus of claim 1, wherein the first conduit is manually aligned with the hole to drop the seeds in the hole, said first conduit being entirely above of said cylinder and said piston.

6. The apparatus of claim 5, wherein the elongated tube is aligned with the hole to drop the dirt collected in the cylinder.

7. The apparatus of claim 4, wherein the container an opening at a bottom thereof, said opening aligned with the first conduit and the funnel permitting said seeds to drop into said funnel through said opening.

8. The apparatus of claim 1, wherein the container includes a second conduit used for dispensing remaining seeds in the container.

9. The apparatus of claim 8, wherein the second conduit includes a cap underneath to selectively seal the second conduit.

10. The apparatus of claim 1, wherein said handle bar and said foot bar are parallel to each other, said handle bar and said foot bar having a same length.

11. The apparatus of claim 1, wherein said foot bar extends outwardly from two lateral sides of said elongated tube, said elongate tube extending through said foot bar.

12. The apparatus of claim 1, wherein said first conduit is parallel to said elongated tube, said first conduit having a same length as said elongated tube.

13. The apparatus of claim 8, wherein said second conduit is secured to an opposite end of container than said first conduit, said first conduit and said second conduit being parallel to each other, said second conduit being shorter than said first conduit.

14. The apparatus of claim 1, wherein said lever is secured to said handle bar with a first bolt which extends perpendicularly through said lever through a side of said lever, said lever further secured to said handle bar with a second bolt which extends perpendicularly through a top of said lever.

15. The apparatus of claim 14, wherein said first bolt extends through a horizontal plane and said second bolt extends through a vertical plane.

16. The apparatus of claim 13, wherein said elongated tube is parallel to said second conduit and said elongated tube being in between said first conduit and said second conduit.

17. The apparatus of claim 1, wherein said handle bar and said container are parallel to each other, said container being in constant abutting contact with said handle bar.

18. The apparatus of claim 1, wherein said first conduit is perpendicular to said foot bar.

19. The apparatus of claim 1, wherein said lever is movable vertically along one distal end towards and away from said handle bar to lower and raise the cylinder, respectively.

20. An apparatus for planting seeds, the apparatus consisting of:
   an elongated tube including a piston, a shaft coupled to the piston, and a cylinder coupled to the piston, said cylinder being entirely below said elongated tube, said piston being within said cylinder;
   a foot bar coupled to the elongated tube, said elongate tube being between said foot bar, said foot bar extending outwardly from lateral sides of said elongated tube;
   a handle bar coupled to the elongated tube, said foot bar and said handle bar being on a same vertical plane;
   a lever provided secured above of the handle bar, wherein the lever is coupled to the shaft, said lever extending a partial length of said handle bar;
   a container provided adjacent to and in constant abutting contact with the handle bar, said container being shorter than said handle bar, said container being entirely above of said elongated tube; and
   a first conduit extended over the length of the elongated tube and coupled to the container to receive the seeds within, such that pressure is applied on the foot bar to insert the elongated tube in ground, said first conduit being secured entirely below said container, said first conduit being parallel to said elongated tube, wherein the lever is operated to lift the cylinder via the shaft and the piston such that the dirt collected in the cylinder creates a hole in the ground, wherein the seeds are released from the container into the hole through the first conduit, said container including an opening leading said seeds to said first conduit, said container further including a second conduit secured to said container and at opposite end of where said first conduit is secured, said second conduit being shorter than said first conduit, said second conduit selectively sealed with a cap, and wherein the lever is operated to drop the dirt collected in the container into the hole to cover the seeds in the hole.

\* \* \* \* \*